(12) United States Patent
Singh

(10) Patent No.: US 7,924,810 B2
(45) Date of Patent: Apr. 12, 2011

(54) METHOD AND COMPUTING SYSTEM FOR CONTROLLING ACCESS

(75) Inventor: Sukhvinder Singh, Karnataka (IN)

(73) Assignee: Hewlett-Packard Development Company, L.P., Houston, TX (US)

(*) Notice: Subject to any disclaimer, the term of this patent is extended or adjusted under 35 U.S.C. 154(b) by 544 days.

(21) Appl. No.: 11/902,131

(22) Filed: Sep. 19, 2007

(65) Prior Publication Data

US 2008/0317012 A1     Dec. 25, 2008

(30) Foreign Application Priority Data

Jun. 21, 2007    (IN) .......................... 1283/CHE/2007

(51) Int. Cl.
*H04L 12/28* (2006.01)
*H04L 12/56* (2006.01)
(52) U.S. Cl. ........................................ 370/351; 370/401
(58) Field of Classification Search .................. 370/237, 370/238, 254, 255, 351, 392, 400, 401
See application file for complete search history.

(56) References Cited

U.S. PATENT DOCUMENTS

| | | | | |
|---|---|---|---|---|
| 5,263,158 A * | 11/1993 | Janis | ................................ | 707/1 |
| 5,469,556 A * | 11/1995 | Clifton | .......................... | 711/163 |
| 5,572,650 A * | 11/1996 | Antis et al. | ..................... | 715/853 |
| 5,765,153 A * | 6/1998 | Benantar et al. | ................... | 707/9 |
| 6,339,423 B1 * | 1/2002 | Sampson et al. | .............. | 715/854 |
| 6,618,366 B1 * | 9/2003 | Furukawa et al. | ............. | 370/338 |
| 6,772,350 B1 * | 8/2004 | Belani et al. | ...................... | 726/2 |
| 6,944,777 B1 * | 9/2005 | Belani et al. | ...................... | 713/150 |
| 7,574,522 B2 * | 8/2009 | Oguchi | .......................... | 709/238 |
| 7,606,813 B1 * | 10/2009 | Gritsay et al. | ................ | 707/100 |
| 2004/0179537 A1 * | 9/2004 | Boyd et al. | .............. | 370/395.54 |
| 2005/0157664 A1 * | 7/2005 | Baum et al. | .................... | 370/256 |

* cited by examiner

*Primary Examiner* — Hong Cho

(57) ABSTRACT

A method and computing system for controlling access by a user to a computing resource located in respective source and destination domains in a hierarchy of domains. The method comprises establishing a path of domains in the hierarchy from the source domain to the destination domain, specifying for at least one domain in the path preceding the destination domain whether traversal to a successive domain in the path is permitted, and providing to the user access to the computing resource if traversal from the source domain to the destination domain along the path is permitted.

11 Claims, 4 Drawing Sheets

METHOD AND COMPUTING SYSTEM FOR CONTROLLING ACCESS

This application claims priority from Indian patent application 1283/CHE/2007, filed on Jun. 21, 2007. The entire content of the aforementioned application is incorporated herein by reference.

BACKGROUND OF THE INVENTION

Organizations that span several divisions (or 'domains') and sub-divisions typically have geographically and functionally separated resources, access to which is required for the functioning of the organization. Such access has a required robustness and security that depend on the organization and its activities, but may be of a very high level in some cases.

Existing role based access solutions typically employ a set of standard techniques. Permissions are mapped between a resource and a requester of that resource statically, access rights are established on a local basis, and access permissions are decided on the basis of a Direct Domain-Resource Mapping alone. Also, the relative locations of a resource access requester and the resources requested are generally disregarded.

However, these approaches have limited scalability across domains and across roles within domains. Furthermore, Direct Domain-Resource Mapping is unsuitable when a single active-entity (generally a user) requires access across domains or outside the designated domains.

BRIEF DESCRIPTION OF THE DRAWING

In order that the invention may be more clearly ascertained, embodiments will now be described, by way of example, with reference to the accompanying drawing, in which.

DETAILED DESCRIPTION OF THE EMBODIMENTS

There will be provided a method of controlling access by a user to a computing resource located in respective source and destination domains in a hierarchy of domains.

In one embodiment, the method comprises establishing a path of domains in the hierarchy from the source domain to the destination domain, specifying for at least one domain in the path preceding the destination domain whether traversal to a successive domain in the path is permitted, and providing to the user access to the computing resource if traversal from the source domain to the destination domain along the path is permitted.

There will also be provided a computing system configured to control access by a user to a desired computing resource located in respective source and destination domains in a hierarchy of domains. In one embodiment, the computing system comprises one or more computing resources including desired computing resource, the computing resources being associated with respective domains, wherein the computing system is configured to respond to a request by the user for access to the desired resource by establishing a path of domains in the hierarchy from the source domain to the destination domain, specifying for at least one domain in the path preceding the destination domain whether traversal to a successive domain in the path is permitted, and providing to the user access to the desired computing resource if traversal from the source domain to the destination domain along the path is permitted.

Figure 1:
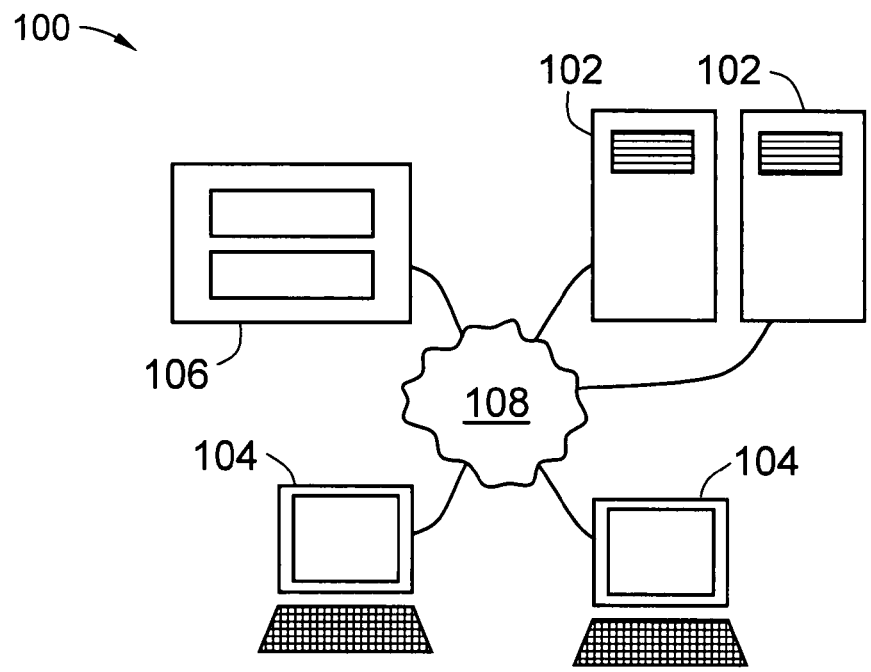
FIG. 1 is a schematic view of a computing network according to an embodiment of the present invention.

FIG. 1 is a schematic view of a computing system in the form of a computing network 100 according to an embodiment of the present invention. The network 100 includes two servers 102, two client computers 104, a printer 106 and networking infrastructure 108 providing an Ethernet 108. The servers 102, client computers 104 and printer 106 communicate via the Ethernet 108. As will be appreciated, each of the servers 102, client computers 104 and printer 106 are representative only, and the computing network 100 may include any number of such computing resources, and indeed any other computing resources (including devices, databases, communications interfaces and processor use). Each computing resource is associated with at least one domain in the organization that operates network 100.

Network 100 is adapted for use by the organization, and also implements a cross domain security method according to this embodiment in that organization. The security method uses a 3D dynamic access matrix and a traversal algorithm to establish privileges for different active-entities (typically users of the resources and located in respective domains) and access rights on passive entities (the network's resources) at various levels. The security method provides a robust and scalable authentication mechanism, which may also be easily integrated with Public Key Infrastructures based on standard x509 Digital Certificates.

To do so, network 100 maintains a "3d access matrix" to provide cross-domain security. The access matrix is domain and role (R) based; each domain is further categorized as either a Source-Domain (SD) or a Destination-Domain (DD). Access rights are established using a traversal algorithm that has "SD", "DD" and "R" as its basic units. The access matrix is flexible and can be expanded to include additional security tags without changing the basic structure.

The access matrix serves as a reference structure for calculating privileges associated with the resources in the organization. The resources may be located in different domains or sub-domains. An active-entity is defined as an entity needed to access a respective resource.

Figure 2:
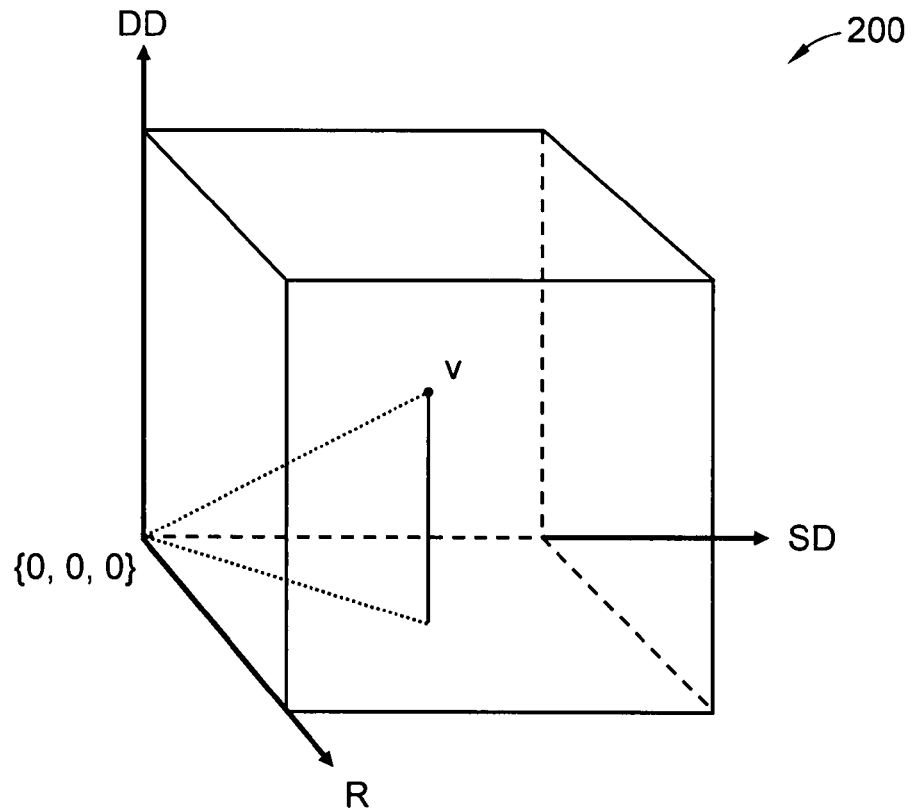
FIG. 2 is a schematic view of an access matrix according to an embodiment of the present invention of the computing network of FIG. 1.

The access matrix according to this embodiment is illustrated schematically at 200 in FIG. 2. Access matrix 200 may be regarded as a cube in a "source-domain" (SD)-"destination-domain" (DD)-"role" (R) space, with one vertex of the cube at $\{SD, DD, R\} = \{0, 0, 0\}$.

Access matrix 200 is constructed from a container matrix, and actually serves as an "access matrix" when once different coordinates in the container matrix have been populated. The coordinate tuple {SD, DD, R} or {sd, dd, r} may have a value "v" depending on the access function (discussed below). The access function maps the coordinates {sd, dd, r} to a value "v" in the access matrix. For example: v1={sd1, dd1, r1}, v2={sd2, dd2, r2}, where v1 and v2 are defined by the access function.

Thus, each of the set T of resolved tuples {SD, DD, R} or {sd, dd, r} that constitute access matrix 200 resolves to a value defined by the access function. Access matrix 200 may be used to decide on the permissions available to an active-entity located in a domain "SD", requesting access to a resource in "DD" for a particular role "R". That is, each resolved tuple carries a decision value (viz. an access right) for an active-entity located in a domain "SD", requesting access to a resource in "DD" for a role "R".

Access matrix 200 may equally be represented as {t1, t2, t3, t4, t5, ... } where t1, t2, t3, ... are resolved tuples of type {SD, DD, R} in a container matrix. For a container matrix, an access matrix is defined. Only when an Access Matrix is present for a container matrix may the matrix be said to be "Protected".

As discussed above, the access function maps a tuple {sd, dd, r} to a value "v", where v is a decision value defined for the resources in an organization. In this embodiment, there are only two values for the access permissions:

v={INT_ACCESS_NA, INT_ACCESS_A} where INT_ACCESS_NA signifies "Intermediate Access permission NOT Allowed" and INT_ACCESS_A signifies "Intermediate Access permission Allowed".

"V" may be varied depending on the security requirements in an organization. "V" may be binary (a simple true or false), or assume multiple values (each describing an access right that depends on plural parameters). In this embodiment, "v" dictates whether a traversing entity (discussed below) can access resources on intermediary nodes. If INT_ACCESS_NA is set, the traversing entity may access the resources of the destination node only. If INT_ACCESS_A is set, the traversing entity may access the resources of the intermediary nodes including the destination node. However, if neither is set, "v" has a null value and the entity cannot traverse.

Access Matrix and the Organization Structure

Figure 3:
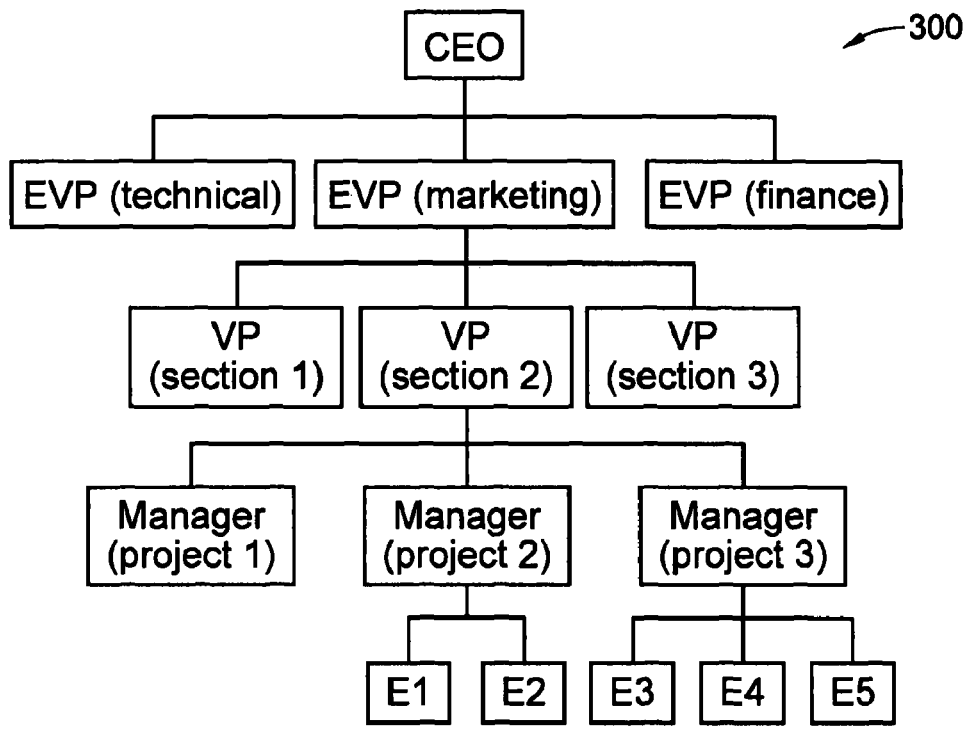
FIG. 3 is a schematic view of an administrative hierarchy of an organization in which the computing network of FIG. 1 may be deployed.

In this example, the basic administrative structure of the organization is hierarchical and hence may be depicted as a tree, as shown at 300 in FIG. 3. The nodes of tree 300 correspond to the chief executive officer (CEO), various executive vice presidents (EVPs), the vice presidents (VPs) of various sections, the managers of various projects and other employees (Es). Each node in administrative structure tree 300 may be regarded as a "domain". The tree 300 in depicted in schematic form in FIG. 4 in somewhat more extensive form at 400; the tree's domains (D1, D2, D3, ..., D17) are indicated in the figure.

Traversal between two domains in tree 400 is used to establish dynamically the privileges of an active-entity. A traversal by an active-entity from a source-domain to a destination-domain may also be through intermediate domains. For example, suppose an active-entity located in the source-domain D14 with a role "r" desires access to resources in domain D17. In this case, a successful traversal from domain D14 to domain D17 for role "r" would establish that the active-entity has the privileges to access the resource in domain D17.

If the destination-domain is ultimately reached in the traversal, the active-entity has the required privileges to access the resources. At every hop from one domain to another, access matrix 200 is consulted to determine whether the next hop can be taken. At each instant, the source-domain and the destination domain are mapped into the matrix, along with the active-entity's role, to obtain the value v of the location or element {SD, DD, R} in access matrix 200. If the value v is set or positive, or otherwise confirms that the active-entity may make the next hop, the entity makes the next hop and the access matrix 200 is again consulted for the next hop. This is repeated until the destination-domain is reached. The destination-domain cannot be reached if any one of the values v is null or otherwise deny further traversing, in which case the active-entity has insufficient rights to access the resource in the destination-domain.

Figure 4:
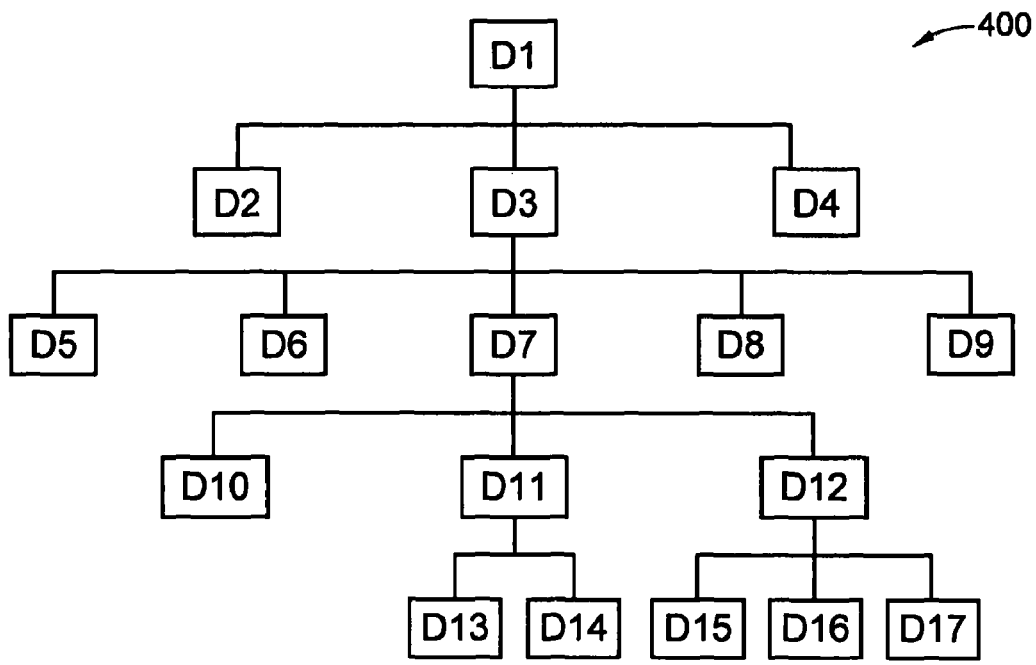
FIG. 4 is an abstracted schematic view of the administrative hierarchy of FIG. 3.
Figure 5:
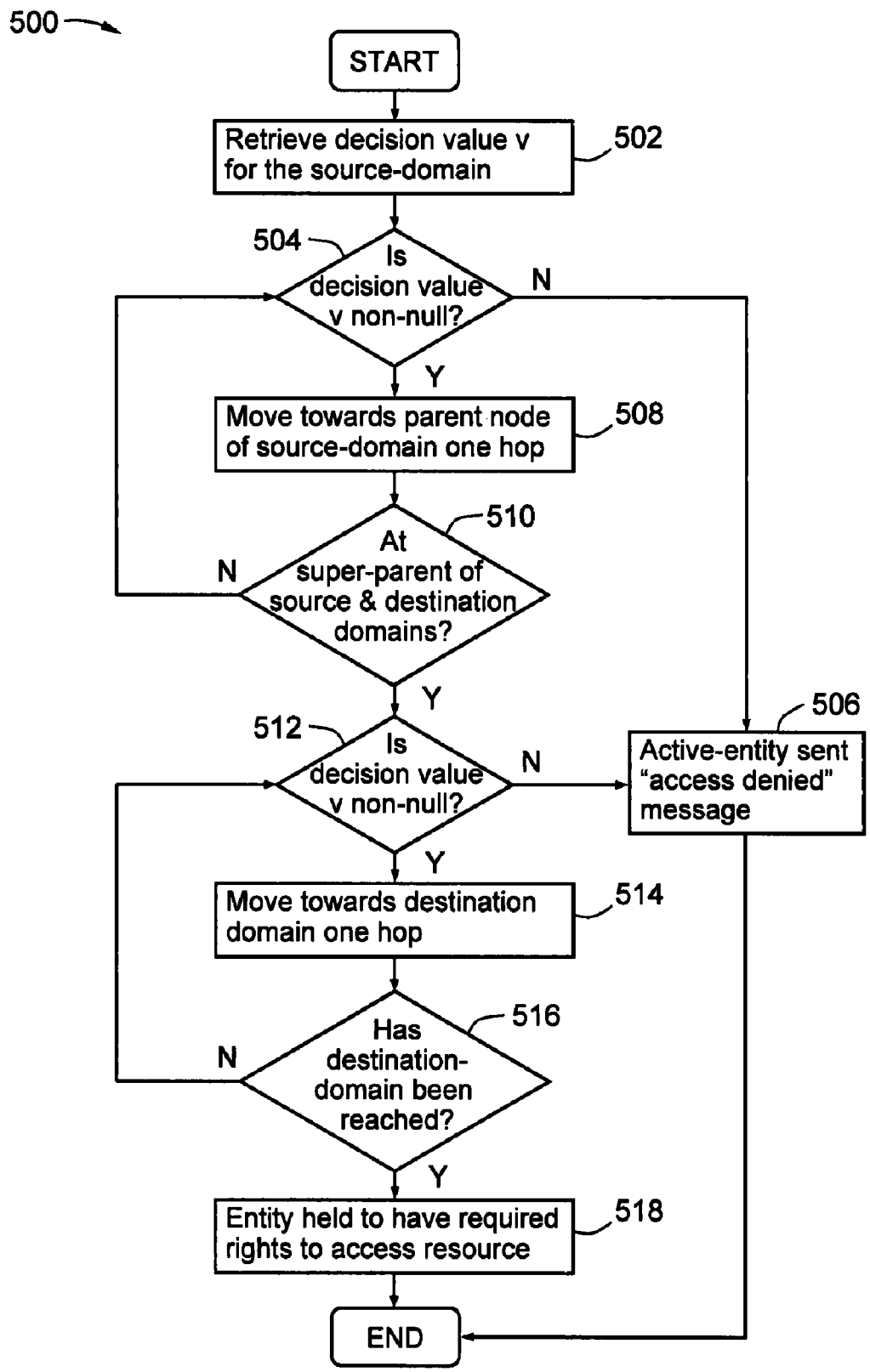
FIG. 5 is a flow diagram of a method of traversing between successive domains according to an embodiment of the present invention in an organizational hierarchy of FIG. 3, implemented in the computing network of FIG. 1.

FIG. 5 is a flow diagram 500 of traversal between two domains. Illustrative domains from FIG. 4 are identified, by way of example.

At step 502, the active-entity starts at the source-domain (e.g. D14 in FIG. 4). At step 504 it is determined whether the current decision value v is non-null. If not (i.e. v is null), processing continues at step 506 where an "access denied" message is returned to the active-entity (in essence, a user) and processing ends.

If, at step 504, v is non-null, processing continues at step 508 where the method moves one hop towards the parent node of the source-domain (e.g. from D14 to D11). At step 510, the current domain is compared with the common super-parent (e.g. D7) of the source-domain (e.g. D14) and destination-domain (e.g. D16) to determine whether that common super-parent has been reached. If not, processing returns to step 504.

If it is determined at step 510 that processing has reached this common super-parent, processing continues at step 512 where it is determined whether the current decision value v is non-null. If not (i.e. v is null), processing continues at step 506 where an "access denied" message is returned to the active-entity and processing ends.

If, at step 512, v is non-null, processing continues at step 514 where the method moves one hop towards the destination-domain (e.g. D7 to D12) then, at step 516, the current domain is compared with the destination-domain (e.g. D16) to determine whether the destination-domain has been reached. If not, processing returns to step 512.

If it is determined at step 516 that processing has reached the destination-domain, processing continues at step 518 where the entity seeking access to the resource(s) at the destination-domain is held to have required rights to access resource. Processing, with respect to the determination of access rights, then ends.

Thus, at each node/domain (apart from the destination domain), the value of v is ascertained for the next hop. Thus, in the example interpolated in the steps above, if active-entity has role "r", v1={D14, D11, r}, v2={D11, D7, r}, v3={D7, D12, r} and v4={D12, D16, r} will be ascertained. If the destination domain is reached without any null value of v being encountered, the active-entity has sufficient rights to access the resource in the destination domain. If the traversal is terminated before completion because a null value of v is encountered, it will have then been established that the active-entity has insufficient rights to access the resource in the destination domain.

Thus, a traversal is always between two domains (a source- and a destination-domain) by an active-entity with role "r". At each instant, these domains may be mapped into access matrix 200, along with the role, to obtain the value v at that point.

Roles

A role is the set of duties assigned to an active-entity. These duties are well-defined in the organization so may be identified as R1, R2, R3, . . . , Rn. A domain may have one or more roles assigned to it. These roles are used by the access function and the authentication mechanism to decide if a traversal between a source-domain and a destination-domain can take place.

Authentication Mechanism

As discussed above, access matrix 200 comprises a populated container matrix. This population is performed as a series of domain assignments.

Figure 6:
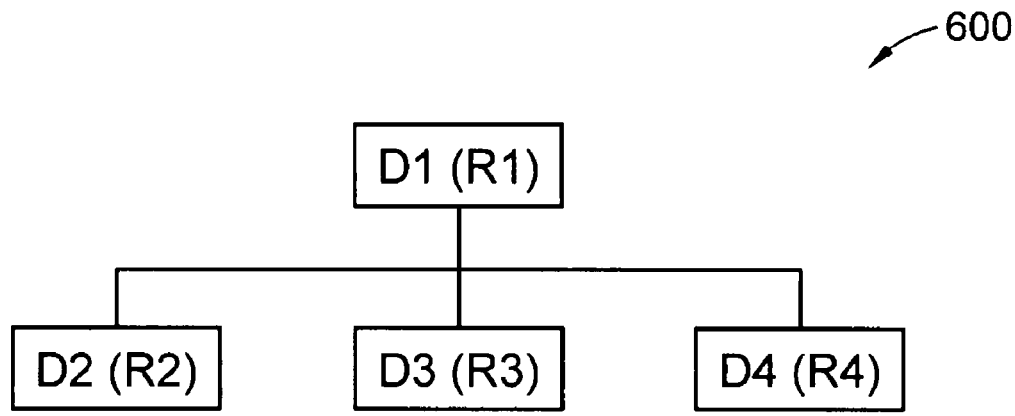
FIG. 6 is a schematic view of an organization administration tree illustrating traversal between adjacent domains according to an embodiment of the present invention by the computing network of FIG. 1.

FIG. 6 depicts an organization administration tree 600 with domains D1, D2, D3 and D4, with respective roles R1, R2, R3 and R4. Referring to FIG. 6, if domain D4 needs to access its own resource to fulfil role R4, the following entry must be present in access matrix 200:

{D4, D4, R4}=INT_ACCESS_A

Intermediate domains need not be traversed, as the source and destination domains may be—though generally will not be—identical. Hence, INT_ACCESS_A is set to indicate that the traversing entity may access the resources of the destination node.

(It should be noted that this point that, when there are intermediate domains, the terms "source-domain" and "destination-domain" can have two meanings. They can also refer to the original and ultimate domains in a path of domains, the former being the active-entity's domain and the latter the resource's domain. However, when describing traversal from the active-entity's domain to the resource's domain, via one or more intermediate domains, these terms may be used to refer to the initial and final domains in any adjacent pair of domains between which traversal is effected.)

If domain D4 needs to access resources in domain D2 for role R4, the access matrix 200 contains the following values:

{D4, D1, R4}=INT_ACCESS_NA
{D1, D2, R4}=INT_ACCESS_A

INT_ACCESS_NA disallows access by domain D4 to resources present at domain D1. However, INT_ACCESS_NA is still a non-null value, so traversal can continue to the destination-domain, domain D2.

Figure 7:
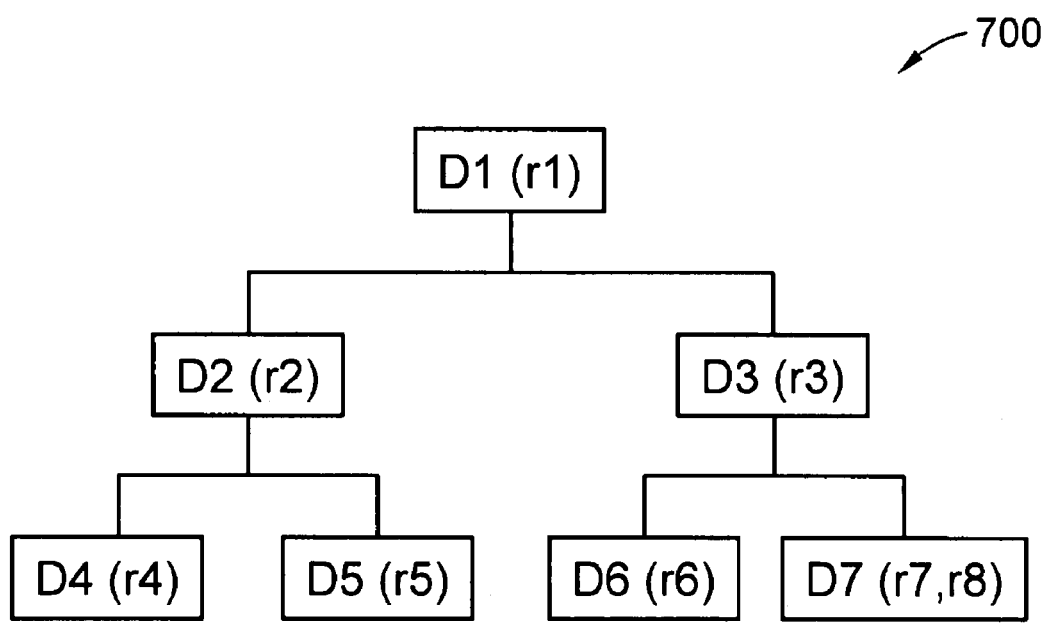
FIG. 7 is a schematic view of another organization administration tree illustrating traversal between adjacent domains according to an embodiment of the present invention by the computing network of FIG. 1.

FIG. 7 depicts an organization administration tree 700 with domains D1, D2, D3, D4, D5, D6 and D7 with respective roles r1, r2, r3, r4, r5, r6 and r7. Domain D7 has the additional role r8. Referring to FIG. 7, if a user in domain D7 needs access to resources in domain D5, access matrix 200 would need the following entries:

{D7, D3, r7}=INT_ACCESS_NA
{D3, D1, r7}=INT_ACCESS_NA
{D1, D2, r7}=INT_ACCESS_NA
{D2, D5, r7}=INT_ACCESS_A

Once the traversal from domain D7 to domain D5 has been successfully made, the user may access the resources of domain D5 with role r7.

The decision values v are of great value in indicating not just whether the entity can traverse, but also whether resources on intermediary points may be accessed. Other values depicting various security levels may be assigned. This allows greater scalability in assigning permission to each individual resource, not only on the basis of its type but also based on where it is in access matrix 200.

It should be noted that, once access matrix 200 has been populated, the decision values v are treated as essentially static, though they may be changed from time of time according to well-defined criteria. The decision values v may also be audited as a part of the organization's security policy.

Authentication using Access Matrix

Active-entities (generally users) in different domains may be authenticated. For example, referring to FIG. 7, a user in domain D4 places a request for a resource in domain D6. The following entries in the access matrix 200 are relevant:

{D4, D2, r4}=INT_ACCESS_NA
{D2, D1, r4}=INT_ACCESS_NA
{D1, D3, r4}=INT_ACCESS_NA
{D3, D6, r4}=INT_ACCESS_A

The traversal algorithm moves through these four tuples listed above. If a tuple has INT_ACCESS_NA or INT_ACCESS_A present, the algorithm proceeds to the next hop to check for the next tuple. This is repeated until the destination-domain D6 is reached.

If the value of any tuple is a null, the path is broken and the destination domain cannot be reached. That is, the user lacks permission to access the resource at domain D6. This would occur if—in a slightly modified case—the decision values v in access matrix 200 were:

{D4, D2, r4}=INT_ACCESS_NA
{D2, D1, r4}=NULL
{D1, D3, r4}=INT_ACCESS_NA
{D3, D6, r4}=INT_ACCESS_N

Access matrix 200 is implemented as a sparse 3d matrix. This saves space when compared with a full implementation. Thus, this approach has the advantages that intra and inter domain authentication is provided, it is scalable at multiple levels and authentication is provided based, not only on role, but also on the position of the entity in an organization. Access permissions are decided on the relative positions of the requestor and the resource. It provides a uniform fine-grained centralized domain-role based access method to access the resources in the organization. Security is increased as a greater number of factors are taken into consideration to decide on the access.

The foregoing description of the exemplary embodiments is provided to enable any person skilled in the art to make or use the present invention. While the invention has been described with respect to particular illustrated embodiments, various modifications to these embodiments will readily be apparent to those skilled in the art, and the generic principles defined herein may be applied to other embodiments without departing from the spirit or scope of the invention. It is therefore desired that the present embodiments be considered in all respects as illustrative and not restrictive. Accordingly, the present invention is not intended to be limited to the embodiments described above but is to be accorded the widest scope consistent with the principles and novel features disclosed herein.

The invention claimed is:

1. A method of controlling access by a user to a computing resource located in a destination domain in a hierarchy of domains, comprising:

storing, in a memory, said hierarchy of domains;

determining, by a processor, a path from a source domain to said destination domain, based on said hierarchy, wherein said source domain precedes said destination domain in said path;

identifying, by said processor, one or more intermediate domains between said source domain and said destination domain in said path;

determining, by said processor, for at least one domain preceding said destination domain in said path whether traversal to a successive domain in said path is permitted based on said at least one domain in said path, said successive domain, and a role of said user; and providing to said user access to said computing resource if traversal from said source domain to said destination domain along said path is permitted wherein said processor is configured to selectively deny access by said user to a computer resource located in one or more of said intermediate domains while permitting traversal to said intermediate domains where access has been denied.

2. A method as claimed in claim 1, including determining whether traversal is permitted from said source domain successively towards said destination domain until either further traversal is not permitted or said destination domain is reached, whereby access to said computing resource is respectively either denied or granted.

3. A method as claimed in claim 1, wherein determining a path comprises determining said path as a shortest path from said source domain to said destination domain.

4. A method as claimed in claim 1, wherein said at least one domain in said path preceding said destination domain comprises said source domain and one or more intermediate domains intermediate said source domain and said destination domain.

5. A method as claimed in claim 1, wherein determining whether traversal is permitted includes determining whether a computing resource in said successive domain can be accessed by said user.

6. A computing system configured to control access by a user to a desired computing resource located in respective source and destination domains in a hierarchy of domains, comprising:
 a processor; and
 one or more computing resources including desired computing resource, said computing resources being associated with respective domains;
 wherein said computing system is configured to respond to a request by said user for access to said desired computing resource by:
  determining, by said processor, a path from said source domain to said destination domain, based on said hierarchy, wherein said source domain precedes said destination domain in said path;
  identifying, by said processor one or more intermediate domains between said source domain and said destination domain in said path;
  determining, by said processor, for at least one domain preceding said destination domain in said path whether traversal to a successive domain in said path is permitted based on said at least one domain in said path, said successive domain, and a role of said user; and
  providing to said user access to said desired computing resource if traversal from said source domain to said destination domain along said path is permitted;
 wherein said processor is configured to selectively deny access by the user to a computer resource located in one or more of said intermediate domains while permitting traversal to said intermediate domains where access has been denied.

7. A system as claimed in claim 6, comprising a computer network including a plurality of computing devices.

8. A system as claimed in claim 6, wherein determining whether traversal to said successive domain in said path is permitted is based on a plurality of criteria including said at least one domain in said path, said successive domain, and a role of said user.

9. A method for controlling access by a user to computing resources located in respective domains in a hierarchy of domains, comprising:
 storing, in a memory, a plurality of three dimensional access matrices, each of the plurality comprising a source domain element, a destination domain element and a user role element;
 storing, in said memory, a permission element associated with each of the plurality of three dimensional access matrices, said permission element specifying whether traversal from said source domain element to said destination domain element for a given user role element is permitted;
 at least partially populating said matrix with data indicative of whether, for a respective element of said matrix, traversal is permitted from said source domain to said destination domain according to said specification;
 wherein said permission element specifies, for at least one of the plurality of three dimensional access matrices, that traversal from said source domain element to said destination domain element for a given user role element is permitted, but denies access to one or more intermediate domains between said source domain and said destination domain.

10. A method as claimed in claim 9, including forming said specification based on a plurality of criteria including one or more of said at least one domain in said hierarchy, said other domain in said hierarchy, and a role of said user.

11. A non-transitory computer readable medium encoded with a computer program which, when executed by a processor, causes the processor to:
 store, in a memory, a hierarchy of domains;
 determine a path from a source domain to a destination domain, based on said hierarchy, wherein said source domain precedes said destination domain in said path;
 identify one or more intermediate domains between said source domain and said destination domain in said path:
 determine for at least one domain preceding said destination domain in said path whether traversal to a successive domain in said path is permitted based on said at least one domain in said path, said successive domain, and a role of a user;
 provide to said user access to said computing resource if traversal from said source domain to said destination domain along said path is permitted; and
 selectively deny access by said user to a computer resource located in one or more of said intermediate domains while permitting traversal to said intermediate domains where access has been denied.

* * * * *

UNITED STATES PATENT AND TRADEMARK OFFICE
CERTIFICATE OF CORRECTION

PATENT NO.        : 7,924,810 B2                    Page 1 of 1
APPLICATION NO.   : 11/902131
DATED             : April 12, 2011
INVENTOR(S)       : Sukhvinder Singh It is certified that error appears in the above-identified patent and that said Letters Patent is hereby corrected as shown below:

In column 7, line 39, in Claim 6, delete "processor" and insert -- processor, --, therefor.

In column 8, line 42, in Claim 11, delete "path:" and insert -- path; --, therefor.

Signed and Sealed this
Sixth Day of September, 2011

David J. Kappos
*Director of the United States Patent and Trademark Office*